Dec. 18, 1934.   S. N. HURT   1,984,582
SCALE STIRRUP
Filed Jan. 12, 1931
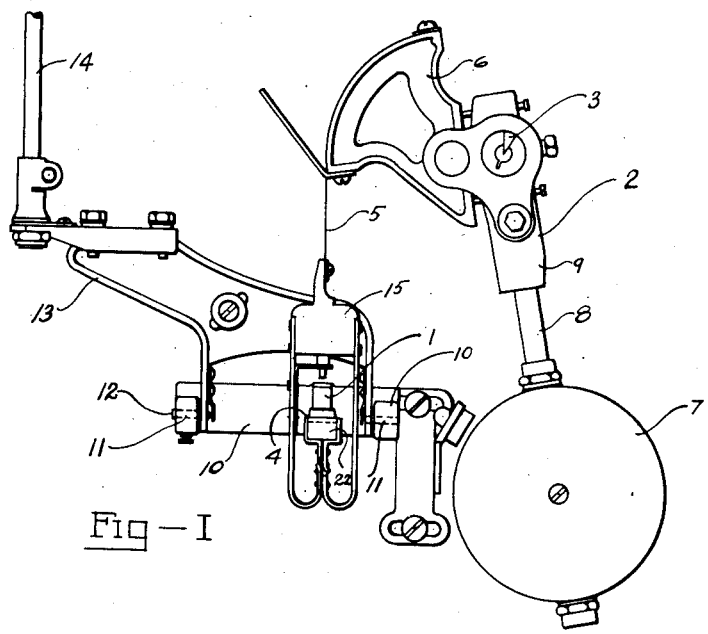
Fig-I
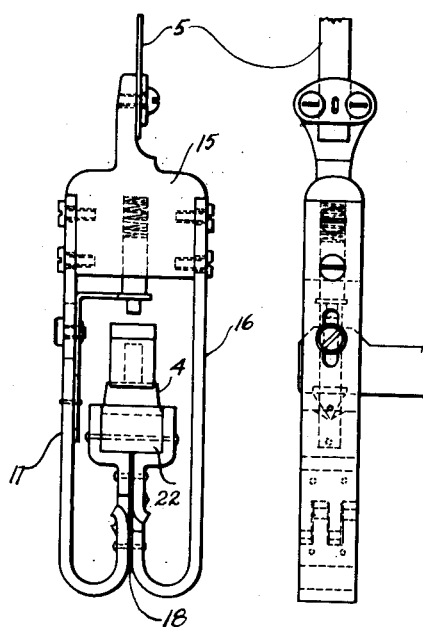
Fig-II   Fig-III
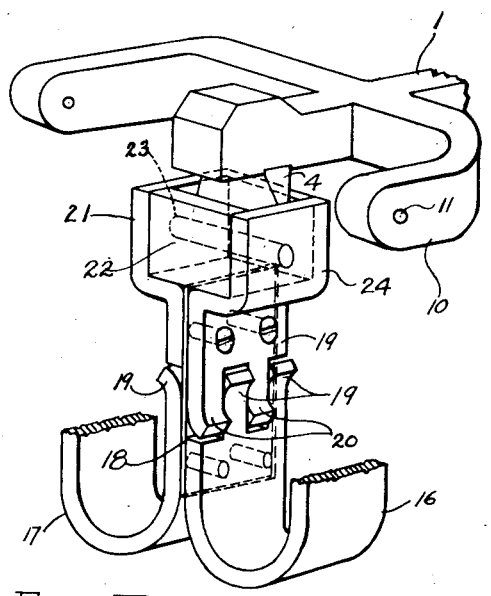
Fig-IV
Samuel N. Hurt
INVENTOR.
BY *Marshall*
ATTORNEY.

Patented Dec. 18, 1934

1,984,582

UNITED STATES PATENT OFFICE 1,984,582

SCALE STIRRUP

Samuel N. Hurt, Toledo, Ohio, assignor to Toledo Scale Manufacturing Company, Toledo, Ohio, a corporation of New Jersey Application January 12, 1931, Serial No. 508,231

5 Claims. (Cl. 265—27)

This invention relates to improvements in scale stirrups and particularly to such stirrups which are used to connect parts which have a relatively large movement. It is essential in stirrups of this kind, especially when the parts connected move in planes at right angles to each other, that the joints move freely in their respective directions and that there be no lost motion between any of the parts. Another essential of a stirrup of this kind is ease of interchange of certain parts.

The primary object of this invention is therefore the provision of an improved scale stirrup having universal movement.

Another object of the invention is the provision of means in a scale stirrup obviating lost motion and reducing friction between the parts to a minimum.

Still another object is the provision in a scale stirrup of a flexure plate for forming an axis of rotation.

Still a further object of the invention is the provision of means in combination with a flexure plate in a stirrup for preventing undesired movements of such plate.

These and other objects and advantages will be apparent from the following description in which reference is had to the accompanying drawing and in which similar reference numerals indicate similar parts throughout the several views.

Referring to the drawing in detail:

Figure I is a fragmentary front elevation of a scale mechanism embodying the stirrup embodying my invention.

Figure II is a front elevational view of a stirrup embodying my invention and portions of the flexible connection and the lever.

Figure III is a side elevational view thereof; and

Figure IV is a fragmentary view, parts broken away of the stirrup embodying the invention and showing its cooperation with a scale lever.

Referring to the drawing in detail, as this stirrup may be used with scales of any type and its use is so well known, I will not describe a scale, but will confine the disclosure to the stirrup per se. The embodiment of the invention is shown as a stirrup connecting a scale lever 1 to a load counterbalancing pendulum 2 which is fulcrumed upon suitable bearings by means of a pivot 3 on a stationary support (not shown). The lever 1, as is customary, is provided with pivots, namely fulcrum load and power pivots. The load pivots, which are not shown, usually support a load receiver for the reception of the commodity or articles to be weighed. The weight of such commodity or article depresses the lever, and the nose pivot 4, which in this case rests in the bearing 22 of the stirrup, transmits the force, resulting from the weight of the load, to the counterbalancing pendulum 2. A flexible connection 5, consisting in this case of a metallic ribbon which overlies the arcuate surface of a cam 6 and which is secured to the pendulum, causes the pendulum to swing about its pivot 3 in an outward and upward direction until the counterbalancing moment of the pendulum weight 7, mounted on the stem 8 which is secured in the body 9, counterbalances the force. As this movement is always in proportion to the load, the lever 1 is provided with an integral bracket 10 which is provided with aligned apertures 11 in which hardened trunnions 12 are fixed, upon which a rack foot 13 is pivotally mounted. An upwardly extending rack rod 14 is secured to the rack foot 13 and carries at its upper end an accurately cut rack (not shown) which meshes with a pinion mounted on the shaft of a rotatable indicating chart. The co-operation of this rack and pinion translates the reciprocatory movement of the lever into rotation; and as all of these movements are in direct proportion to the weight of a commodity or article on the load receiver, serve to indicate the weight of the load.

The stirrup in which my invention resides comprises a yoke head portion 15 to which two members 16 and 17 are fastened. These members have inwardly and upwardly formed portions between which a flexure plate 18 is located. The upward projections are also provided with outwardly curved extensions 19 and which are offset and interdigitate with similar extensions 20 of a pair of Z-shaped brackets 21 and 24 which are fastened to the upper end of the flexure plate 18 and support and hold a bearing 22. This bearing 22 is pivotally mounted upon a short shaft 23 which extends through an aperture of the bearing and is secured in the upwardly extending arms of the Z brackets 21. The bearing 22 serves to engage the nose pivot 4 of the lever 1.

The outwardly curved extensions 19 and 20 are designed to overlap the axis of rotation of the flexure plate 18. When a force, which tends to a sidewise deflection of this plate, is set up, the extensions 19 on one side of the flexure plate 18 will contact the projections 20 of the brackets 21 through the flexure plate 18, which being interposed between the two will thus be prevented from flexing sidewise and it is forced to pivot only on its predetermined axis of rotation. If this were not the case, errors in the indication of the scale would result. The bearing 22 is mounted at right angles to the axis of rotation of the flexure plate 18 in a manner which prevents lost motion, and it will be readily seen that the construction as described permits all necessary movements and is well suited for the purposes intended and also that the objects primarily stated are effectively attained.

The embodiment of my invention herein shown and described is to be regarded as illustrative only, and it is to be understood that the invention is susceptible to variation, modification and change within the spirit and scope of the subjoined claims.

Having described my invention, I claim:

1. In a weighing scale, in combination, with load counterbalancing mechanism, means for connecting two relatively movable parts comprising a yoke like member, a thin flexible member secured to said yoke, two substantially Z shaped brackets fastened to said thin flexible member and adapted to support a bearing for a pivot and means integral with said Z shaped brackets and said yoke like members for preventing movement of said flexible member about any but a predetermined axis.

2. In a weighing scale, in combination, two relatively movable scale members whose planes of movement lie at right angles to each other, a stirrup for operatively connecting said members comprising side members, a portion of a thin flexible ribbon clamped between said side members, means for holding a bearing clamped to the remaining portion of said thin flexible ribbon, said bearing holding means and said side members having outwardly curved extensions overlying a zone of flexure of said ribbon, said extensions being adapted to hold similar extensions and be held thereby against all but axial movement.

3. In a weighing scale, in combination, with load receiving mechanism and load counterbalancing mechanism, a pivot bearing mounting comprising two inflexible members, two inflexible brackets, a thin flexible ribbon adapted to be clamped between said inflexible members and said brackets, said inflexible members and said brackets having curved interdigitated extensions overlying a zone of flexure of said ribbon and preventing all but axial movement thereof.

4. In a weighing scale, in combination, with relatively movable scale members, a pivot bearing having a plurality of extending projections, similar projections extending from one of said scale members, a thin flexible metallic ribbon clamped between said projections of said bearing and said scale member, said projections having curved interdigitated extensions overlying a zone of flexure.

5. In an automatic weighing and indicating scale, in combination, a load supporting lever system, a load offsetting pendulum, means for connecting said lever system and said pendulum comprising a bearing, a yoke depending from said pendulum, a thin flexible ribbon secured to and connecting said bearing and said yoke and overlapping curved portions secured to said bearing and said yoke for reinforcing said flexible ribbon and overlying a zone of flexure for preventing all but axial movement of said ribbon.

SAMUEL N. HURT.